United States Patent
Cho

Patent Number: 5,679,243
Date of Patent: Oct. 21, 1997

[54] WATER PURIFIER HAVING A FILTER REPLACEMENT INDICATOR INCLUDING A CIRCUIT BOARD AND LAMPS

[75] Inventor: Moon-Hyun Cho, Suwon, Rep. of Korea

[73] Assignee: Samsung Electronics Co., Ltd., Suwon, Rep. of Korea

[21] Appl. No.: 557,578

[22] Filed: Nov. 14, 1995

[30] Foreign Application Priority Data

Nov. 14, 1994 [KR] Rep. of Korea ............... 94-30250

[51] Int. Cl.$^6$ ................................................. B01D 17/12
[52] U.S. Cl. ..................... 210/94; 210/232; 210/257.1
[58] Field of Search ......................... 210/85, 87, 89, 210/94, 96.1, 192, 257.1, 257.2, 541, 232; 222/23, 36, 189.06; 55/274; 340/603, 609; 345/204, 205, 206

[56] References Cited

U.S. PATENT DOCUMENTS

| | | | |
|---|---|---|---|
| 4,885,081 | 12/1989 | Oliver | 210/87 |
| 5,089,144 | 2/1992 | Dzkahyaoglu et al. | 210/192 |
| 5,131,277 | 7/1992 | Birdsong et al. | 210/87 |
| 5,536,395 | 7/1996 | Kuennen et al. | 210/87 |

*Primary Examiner*—Joseph W. Drodge
*Attorney, Agent, or Firm*—Burns, Doane, Swecker & Mathis, L.L.P.

[57] ABSTRACT

A water purifier includes filters, a tank for storing water purified by the filters, and an indicator for indicating when it is time to replace the filters. The indicator comprises a circuit board oriented vertically within a chamber disposed beneath the tank, and lamps connected to the circuit board.

2 Claims, 4 Drawing Sheets

WATER PURIFIER HAVING A FILTER REPLACEMENT INDICATOR INCLUDING A CIRCUIT BOARD AND LAMPS

BACKGROUND OF THE INVENTION

1. Field of the Invention

The present invention relates to a water purifier having filters for removing harmful materials contained in potable water to thereby obtain hygienic purified water.

2. Description of the Prior Art

Generally, a water purifier is provided at an upper slide of a body 1 thereof with a purified water tank 2 for storing purified water separated from pollutant materials, as illustrated in FIG. 1.

The purified water tank 2 is connected at a front surface thereof with a dipensing outlet 4 for dispensing the purified water stored therein according to manipulation of a lever 3, and is provided at a rear side thereof with filtering means 7 for eliminating harmful materials contained in the potable water (hereinafter referred to as water) supplied through a water supply pipe 6 connected to a faucet 5.

Furthermore, the filtering means 7 includes a preprocessing filter 7a for removing harmful organic chemical materials such as chlorine substances and the like contained in the water, a membrane section 7b for eliminating various pollutant materials such as heavy metals, cancer-causing materials and the like contained in the water pressurized at and supplied by the pre-processing filter 7a, and a post-processing filter 7c for removing odor components such as toxic gas and the like contained in the water exciting the membrane section 7b.

Accordingly, the water supplied through the water supply pipe 6 from the faucet 5 passes through the pre-processing filter 7a to firstly be separated from organic chemical materials such as chlorine substances and the like contained in the water, and to secondly be removed of cancer-causing materials and heavy metals at the section membrane 7b and to lastly be eliminated of toxic odor and the like at the post-processing filter 7c, and then, to thereafter be stored in the purified water tank 2 at a predetermined appropriate level.

Water dispensing is possible by manipulation of the lever 3 to thereby open the dispensing outlet 4.

In addition, the filtering means 7 should be replaced after a certain period of use, and if no replacement is done within an appropriate period, the water purifier loses water purifying capability remarkably.

However, there is a problem in the conventional water purifier thus constructed in that no notifying means for advising in advance of the need of replacement of the filtering means is provided thereon, so that the water purifying capability is decreased markedly, and, at the same time, a difficulty in determining the need for replacement and the like causes tremendous inconveniences is using the water purifier.

SUMMARY OF THE INVENTION

The present invention has been disclosed to solve the aforementioned problem and it is an object of the present invention to provide a water purifier employing an easily assembleable and easily releasable circuit substrate provided with a plurality of display lamps for signaling when it is time to replace water filters.

In accordance with the object of the present invention, there is provided a water purifier employing a body, filtering means for being arranged at the body to thereby eliminate harmful materials included in the water and a purified water tank for storing the purified water supplied from the filtering means, the water purifier comprising:

a circuit substrate capable of easy assemblage and disassemblage disposed in a chamber of the body with a plurality of display lamps for notifying an appropriate time for replacement of filtering means, to thereby increase productivity of the purifier and to prevent ingress of moisture from the outside, so that the occurrence of accidents by short circuit, electric leakage and the like can be avoided in advance.

BRIEF DESCRIPTION OF THE DRAWINGS

For a better understanding of the nature and objects of the invention, reference should be made to the following detailed description taken in conjunction with the accompanying drawings in which.

DETAILED DESCRIPTION OF A PREFERRED EMBODIMENT OF THE INVENTION

Figure 1:
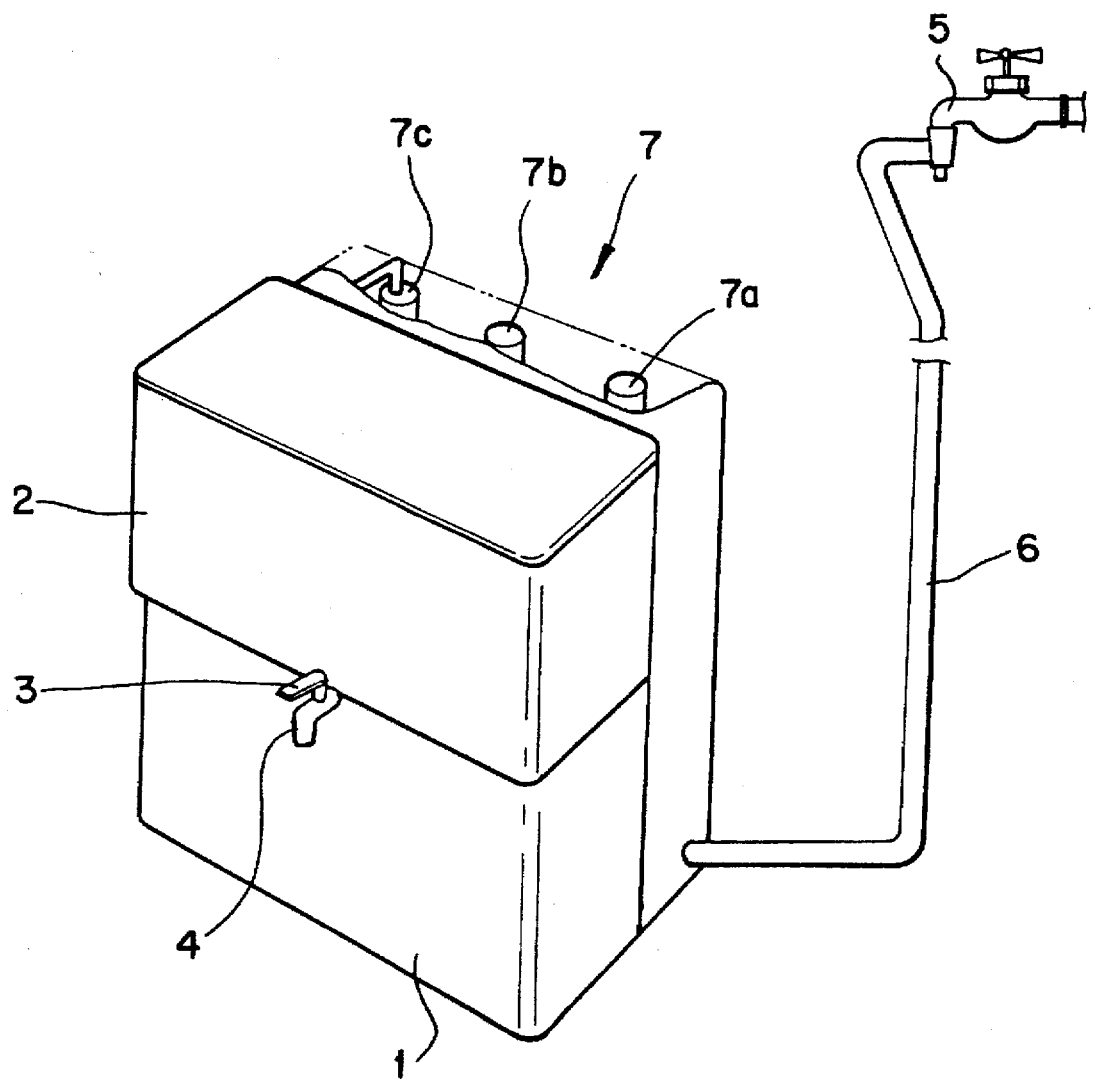
FIG. 1 is a schematic perspective view of a conventional water purifier.
Figure 2:
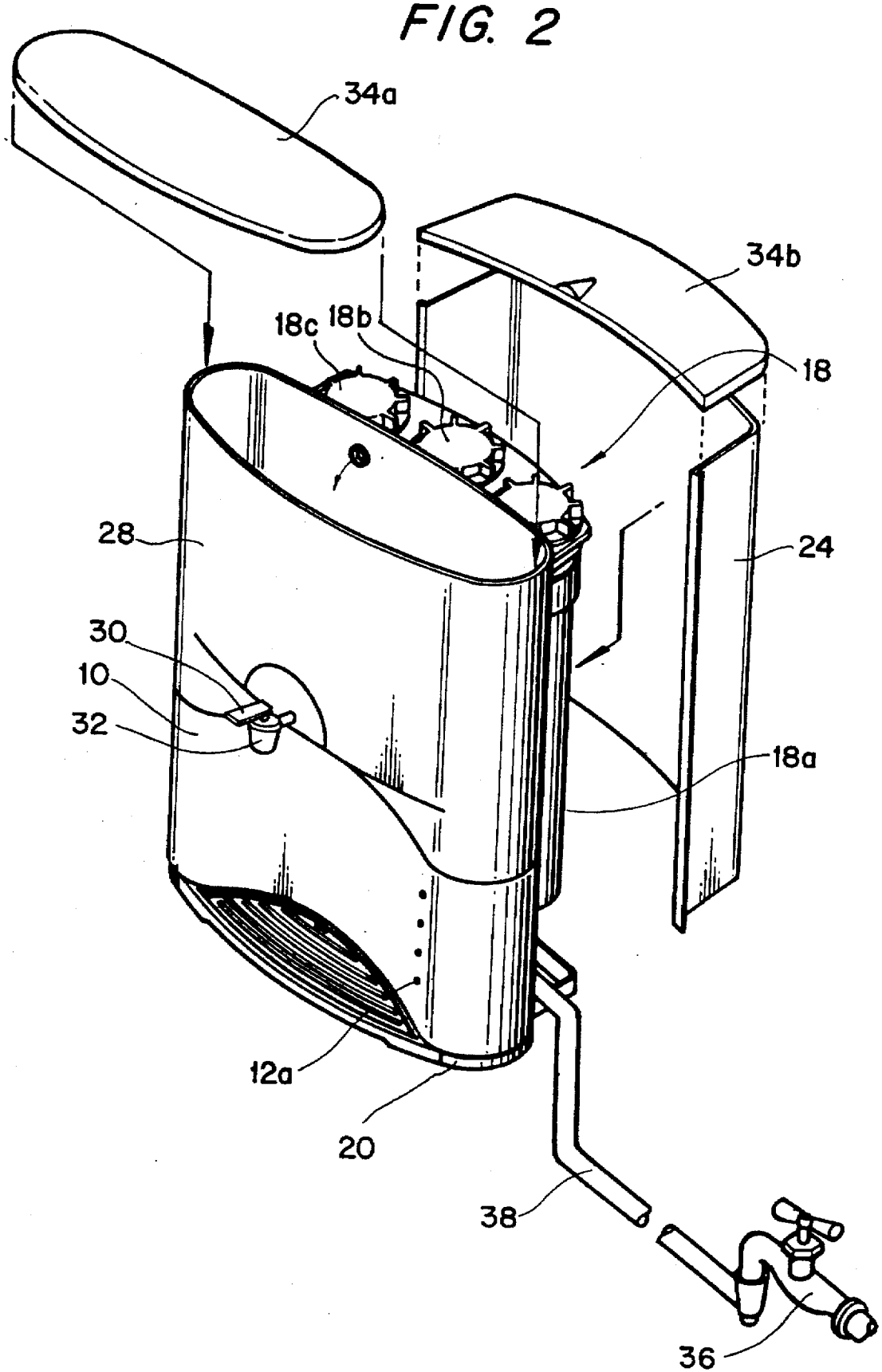
FIG. 2 is an exploded perspective view of a water purifier according to the present invention.
Figure 3:
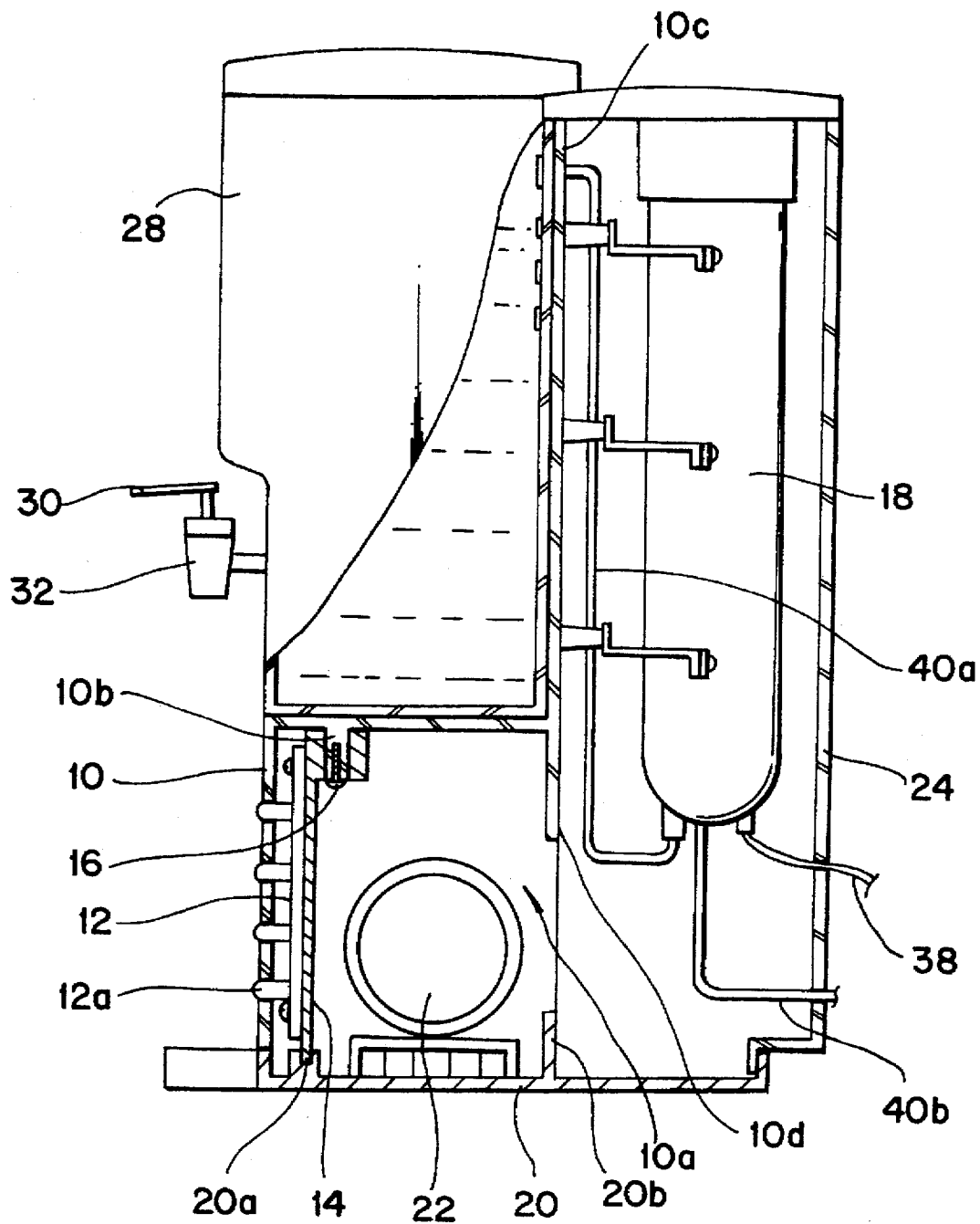
FIG. 3 is an assembled sectional view partially cutaway, of a water purifier according to the present invention.
Figure 4:
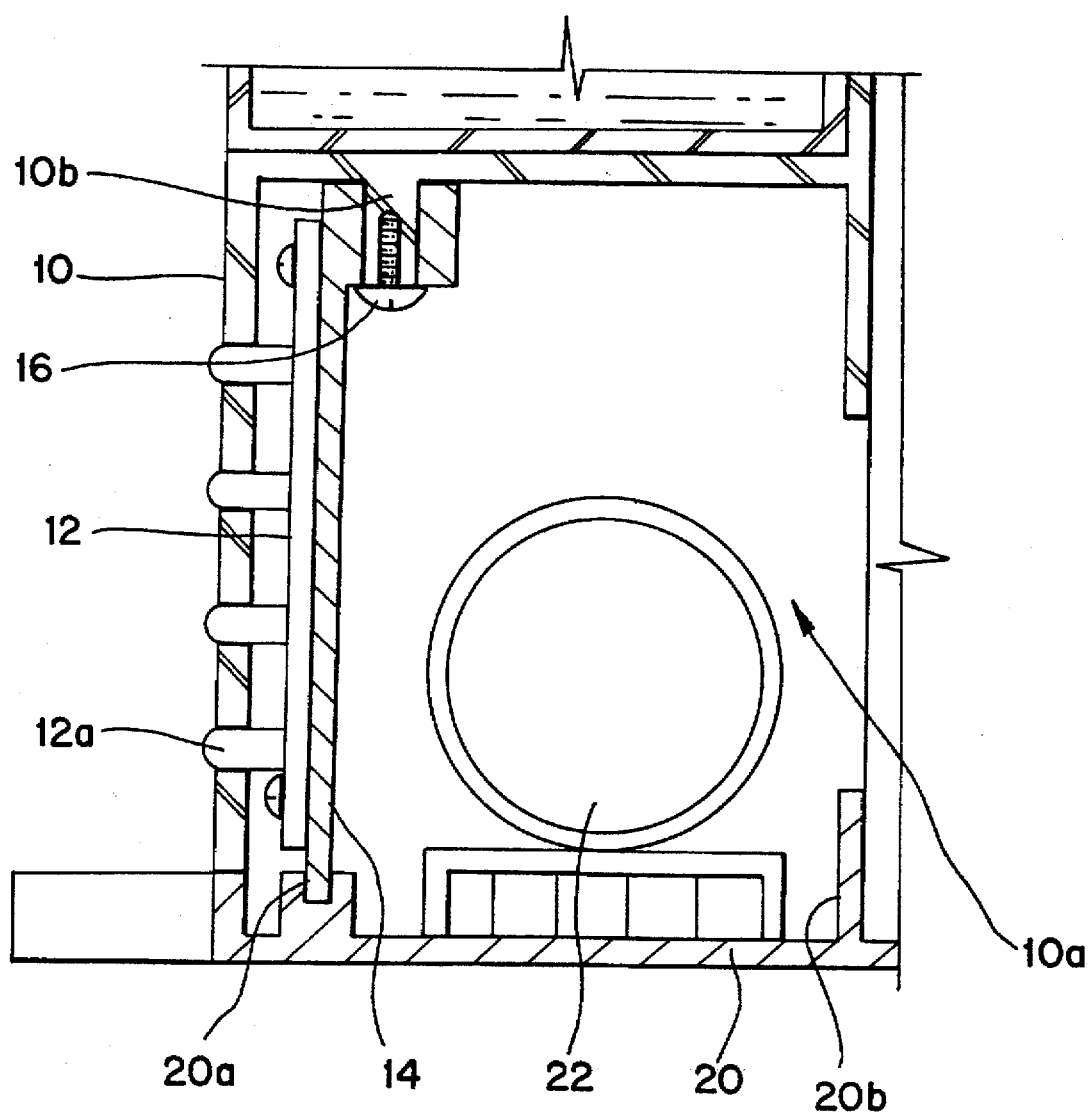
FIG. 4 is an enlarged sectional view of the principal parts of the water purifier according to the present invention.

Reference numeral 10 in the drawings indicates a body forming an accommodation chamber 10a thereunder, and a boss unit 10b protrudinly formed at an upper side of the accommodation chamber 10a. The boss is provided with a holder member 14 equipped at one vertical side thereof with a circuit substrate 12 or circuit board. The member 14 is fixedly fastened by a bolt 16, and the circuit substrate 12 is arranged with a plurality of display lamps 12a.

It is preferable that the circuit substrate 12 should be installed at one side of the accommodation unit 10a and the display lamps should be made of light emitting diodes for emitting a plurality of colors, for example, for emitting green color in a normalcy state of operation and for emitting red color during an abnormalcy state of operation.

Furthermore, the body 10 provided at a rear side thereof with a rear wall 10c, which supports filtering means 18 including a pre-processing filter 18a, a membrane section 18b and a post-processing filter 18c.

The rear wall 10c is provided at a lower side thereof with a water drop infuse prevention jaw 10d.

Meanwhile, the body 10 is coupled at a lower side thereof with a base member 20 formed with an insertion groove 20a for receiving a lower side of the holder member 14, and the base member 20 supports a pressure pump 22 for applying pressure to the water supplied from the membrane section 18b.

The base member 20 facing the water drop infuse prevention jaw 10d is provided at an upper side thereof with a protruding wall 20b for preventing penetration into the chamber of 10a of moisture from dropped water, purified water and the like.

The body 10 is coupled at a rear surface thereof with a back cover 24 and is releasably fitted at an upper side thereof to a purified water tank 28 for storing the purified water separated from various harmful materials included in the water which has passed through the filtering means 18.

The purified water tank 28 is connected at a front surface thereof with a disposal outlet 32 for discharging the purified water in the purified water tank 28 by way of manipulation of a lever 30.

Furthermore, the purified water tank 28 and the back cover 24 are provided at upper sides thereof with lid plates 34a and 34b respectively. The filtering means 18 is so constructed as to be connected to a water supply pipe 38 coupled to a faucet 36 so that water supply can be made possible.

Numeral 40a in the drawings represents a purified water pipe for supplying the purified water from the filtering means 18 into the purified water tank 28.

Reference numeral 40b is a discharge pipe for discharging concentrated unfiltered water produced at the filtering means 18.

Now, the operation of the water purifier thus constructed according to the present invention will be described.

First of all, the water supplied from the faucet 36 to the filtering means 18 through the water supply pipe 38 passes through the pre-processing filter 18a, the membrane section 18b and the post-processing filter 18c to be separated from various harmful materials contained in the water and to be infused into the purified water tank 28 to thereby maintain a predetermined appropriate level. The concentrated unfiltered water generated at the membrane section 18b is discharged outside of the body 10 through the discharge pipe 40b.

At this time, the water supplied to the membrane section 18b serves to perform a water purifying operation by way of reverse osmotic pressure caused by pressure according to operation of the pressure pump 22, and the purified water stored in the purified water tank 28 is dispensed by way of manipulation of the lever 32 through the disposal outlet 32.

The filtering means 18 should be replaced after a certain period of time of use and at that time, the plurality of display lamps which emit green lights at normalcy serve to emit red lights for notifying of the need for replacement of the filtering means 18.

Meanwhile, an assembly sequence of the circuit substrate 12 employing the display lamps 12a is done in such way that, an upper portion of the holder member 14 to which the circuit substrate 12 is coupled is inserted to the boss unit 10b and is fastened by the bolt, and a lower end of the holder member 14 is inserted into the insertion groove 20a formed at the base member 20, which in turn is assembled to a lower side of the body, thus completing the assembly of the circuit substrate 12.

At this time, it is preferable that the holder member 14 inserted into the boss unit 10b should be flexible so that the plurality of display lamps 12a equipped at one side of the circuit substrate 12 can protrude through holes formed in a vertical front wall of the body 10.

Furthermore, the circuit substrate 12 vertically provided in the accommodation chamber 10a formed in the body 10 is not susceptible to mishaps such as electrical leakage, short circuit and the like because the water drop infusion prevention jaw 10d and the protruding wall 20b prevent the infuse of water dripping from the filtering means 18 or purified water pipe 40a into the accommodation chamber 10a.

Is apparent from the foregoing, the water purifier according to the present invention is provided with a plurality of display lamps for notifying in advance the need for replacement of the filtering means to thereby enable replacement of the filtering means at an appropriate time, and the circuit substrate equipped with the display lamps can be easily assembled and disassembled for increase of manufacturing productivity thereof, and more particularly, electrical accidents such as electrical leakage, short-circuit and the like can be prevented in advance by preventing penetration of humidity from the outside.

Having described specific preferred embodiments of the invention with reference to the accompanying drawings, it is to be understood that the invention is not limited to that precise embodiment, and that various changes and modifications may be effected therein by one skilled in the art with our departing from the scope or spirit of the invention as defined in the appended claims.

What is claimed is:

1. A potable water purifier, comprising:
    a housing body including a base, and a chamber disposed within the housing body, the chamber including a top wall spaced above the base, and a generally vertical wall, the base including a groove;
    a boss extending downwardly from the top wall and situated within the chamber;
    a holder including a lower portion mounted in the groove, and an upper portion attached to the boss;
    a circuit board mounted on the holder and arranged generally vertically within the chamber behind the generally vertical wall;
    display lamps connected to the circuit board and projecting through respective holes formed in the generally vertical wall for indicating a filter replacement time;
    a filter mounting structure disposed within the housing body for mounting at least one water filter; and
    a water storage tank mounted to the housing body for storing filtered water.

2. The water purifier as defined in claim 1 wherein the chamber is disposed beneath the tank.

* * * * *